C. M. WHEATON.
SELF OILING BEARING FOR PULLEYS.
APPLICATION FILED SEPT. 17, 1909.
954,837.
Patented Apr. 12, 1910.
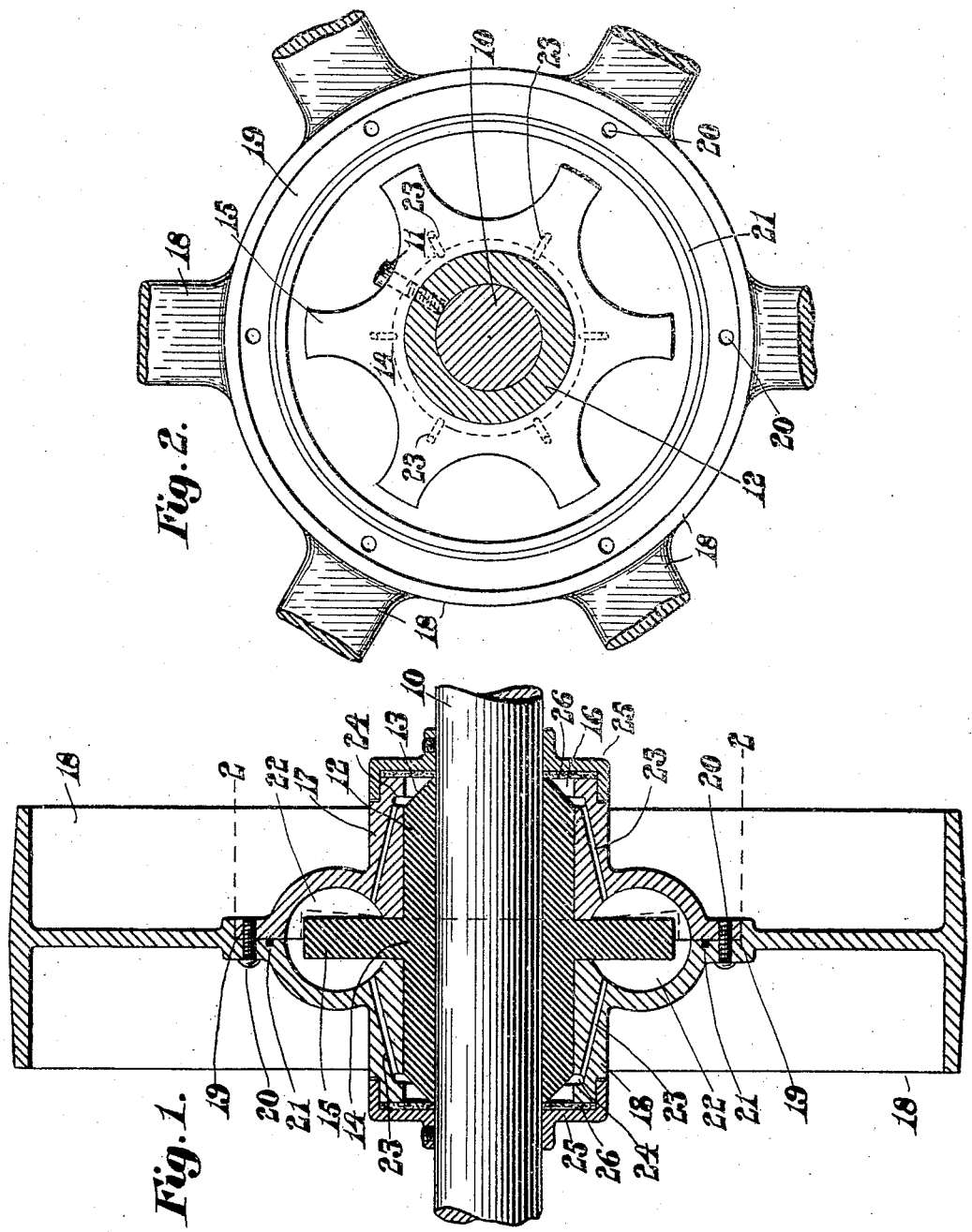
Witnesses:
Nathan C. Lombard
Eva W. Marshall
Inventor:
Carl M. Wheaton,
by Walter E. Lombard,
Atty.

UNITED STATES PATENT OFFICE.

CARL M. WHEATON, OF NEWTONVILLE, MASSACHUSETTS, ASSIGNOR TO GEORGE OTIS DRAPER, OF NEW YORK, N. Y.

SELF-OILING BEARING FOR PULLEYS.

954,837.     Specification of Letters Patent.    Patented Apr. 12, 1910.

Application filed September 17, 1909. Serial No. 518,705.

*To all whom it may concern:*

Be it known that I, CARL M. WHEATON, a citizen of the United States of America, and a resident of Newtonville, in the county of Middlesex and State of Massachusetts, have invented certain new and useful Improvements in Self-Oiling Bearings for Pulleys, of which the following is a specification.

This invention relates to self oiling bearings and is particularly designed for use on revoluble pulleys mounted upon a non-revoluble shaft, the object being to provide a means for effectually circulating the lubricating oil over the contacting surfaces of the revoluble and non-revoluble members, and confining it wholly within the hub of the outer member.

This invention further consists in certain novel features of construction and arrangement of parts which will be readily understood by reference to the description of the drawings and to the claims hereinafter given.

Of the drawings: Figure 1 represents a section of a self oiling pulley embodying the features of the present invention. Fig. 2 represents a transverse section on line 2—2 on Fig. 1, one portion of the divided hub of the pulley being removed.

Similar characters designate like parts throughout the several figures of the drawings.

In the drawing, the non-revoluble shaft 10 has secured thereto by any suitable means, as for instance, the set screw 11, the cylindrical member 12 the ends of which are made conical as indicated at 13, while midway of the ends is the disk portion 14 terminating in a plurality of radiating arms 15. The periphery of the cylindrical member 12 fits the interior bore or chamber 16 of the hub 17 of the pulley or other member 18. The hub 17 is divided on a line midway of the ends of said cylindrical member 12, one portion of said hub 17 fitting into a recess 19 in the pulley or other member 18 and secured thereto by a plurality of screws or other securing members 20, the joint between the two portions being packed by a suitable annular packing member 21 set in a recess in one of said portions and projecting slightly therefrom. Each portion of the hub 17 is provided with an annular recess, which recesses combined form an annular pocket 22 into which project the radiating arms 15. Passages 23 extend from the pocket 22 on either side of the disk portion 14 to grooves 24 formed in the wall of the bore or chamber 16 beyond the ends of the cylindrical member 12. As the pulley 18 revolves, the oil in the pockets 22 will strike against the stationary radiating arms 15 and be kept thereby in continuous movement. The oil in the pocket 22 will pass along the face of the disk portion 14 and along the periphery of the cylindrical chamber 12 into the chambers 16. It will then by centrifugal action be thrown into the grooves 24 and along the passages 23 until it again enters the pocket 22.

Secured to the shaft 10, at each end of the hub 17, is a cup-shaped member 25 extending over and inclosing the ends thereof, between which ends and the bottom of the cup-shaped members 25, is a packing 26 of leather or some similar material soaked with oil. These cup-shaped members prevent the oil from escaping and also keep out the dirt and other foreign substances from the bearing surfaces.

The conical ends 13 are for the purpose of giving a longer bearing surface to the cylindrical member 12 upon the shaft 10 on which it is mounted, while a much shorter bearing surface is provided for the pulley 18 which is mounted on the periphery of said cylindrical member. As the hub of the pulley extends out in either direction as far as the extreme ends of the cylindrical member, a cavity or chamber is formed at either end of the cylindrical member in which oil is permitted to collect until by centrifugal force it is caused to pass through the passages 23 into the main oil reservoir 22. While in these end chambers 16, it soaks the packing 26 and thus provides a means whereby the chambers are more perfectly sealed than would be the case if the packing member 26 were permitted to become dry.

It is obvious that without altering the principles of the invention the operation of the various members may be reversed, the outer member remaining stationary, while the inner member or shaft revolves.

This makes a very effectual self oiling bearing, the operation and advantages of which it is believed will be fully apparent without further description.

Having thus described my invention, I claim:

1. The combination with a non-revoluble shaft; of a cylindrical member secured thereto provided with a plurality of radiating arms; a revoluble pulley mounted upon said cylindrical member having a hub the ends of the bore of which extend beyond the ends of the periphery of said cylindrical member and provided with an annular pocket adapted to receive said radiating arms, and passages from said pocket to the ends of said cylindrical member; and members secured to said shaft and closing the ends of the hub of said pulley and forming an annular chamber with which said passages communicate.

2. The combination with a non-revoluble shaft; of a cylindrical member secured thereto provided with a plurality of radiating arms and having conical ends; a revoluble pulley mounted upon said cylindrical member and provided with an annular pocket adapted to receive said radiating arms and passages from said pocket to the ends of said cylindrical member; members secured to said shaft and closing the ends of the hub of said pulley; and annular packing disks interposed between said closing members and the ends of the pulley hub.

3. The combination with a non-revoluble shaft; of a cylindrical member secured thereto provided with a plurality of radiating arms and having conical ends; and a revoluble pulley mounted upon said cylindrical member and provided with an annular pocket adapted to receive said radiating arms and passages from said pocket to the ends of said cylindrical member.

4. The combination with a non-revoluble shaft; of a cylindrical member secured thereto provided with a plurality of radiating arms; a revoluble pulley mounted upon said cylindrical member having a hub the ends of the bore of which extend beyond the ends of the periphery of said cylindrical member and provided with an annular pocket adapted to receive said radiating arms and passages from said pocket to the ends of said cylindrical member; and cup-shaped members secured to said shaft and fitting over the ends of the hub of said pulley and forming an annular chamber with which said passages communicate.

5. The combination of two members, one of which rotates relatively to the other and one of which is provided with a chambered hub surrounded by an annular pocket connected by passages to grooves formed in the chambered portion of said hub; a cylindrical member fitting the chambered portion of said hub the ends of which are well within the ends of said hub and provided with a plurality of radiating arms extending into said annular pocket; means for securing said cylindrical member to the inner of said two members; and closures secured to said inner member and co-acting with the ends of said hub to form an annular chamber between the ends of said cylindrical member and said closures.

6. The combination of two members, one of which rotates relatively to the other and one of which is provided with a chambered hub surrounded by an annular pocket connected by passages to grooves formed in the chambered portion of said hub; a cylindrical member fitting the chambered portion of said hub the ends of which are well within the ends of said hub and provided with a plurality of radiating arms extending into said annular pocket; means for securing said cylindrical member to the inner of said two members; and cup-shaped members secured to the inner member and inclosing the ends of the hub of the outer member, thereby forming an inclosed chamber within said hub beyond the ends of said cylindrical member.

Signed by me at 4 Post Office Sq., Boston, Mass., this 16th day of September 1909.

CARL M. WHEATON.

Witnesses:
WALTER E. LOMBARD,
NATHAN C. LOMBARD.